United States Patent
Simuni

[11] Patent Number: 5,175,998
[45] Date of Patent: Jan. 5, 1993

[54] EXHAUST SYSTEM

[76] Inventor: Leonid Simuni, 1056 Neilson St., Apt. 6A, Far Rockaway, N.Y. 11691

[21] Appl. No.: 440,351

[22] Filed: Nov. 22, 1989

[51] Int. Cl.$^5$ .............................................. F01N 3/02
[52] U.S. Cl. ...................................... 60/310; 55/250; 55/DIG. 30; 60/307; 60/311
[58] Field of Search ................. 60/307, 301, 311, 309; 55/DIG. 30, 250

[56] References Cited

U.S. PATENT DOCUMENTS

| | | | |
|---|---|---|---|
| 3,738,085 | 6/1973 | Nishinomiya | 60/298 |
| 3,984,219 | 10/1976 | Huang | 60/310 |
| 4,184,858 | 1/1980 | Walker | 60/310 |
| 4,821,513 | 4/1989 | Pickering | 60/310 |

*Primary Examiner*—Douglas Hart

[57] ABSTRACT

An exhaust system for use with automobile engines and industrial plants for filtering exhaust emissions. An exhaust system comprises the exhaust pipe from the combustion chambers, the dehydrating filters and the cleaning device for the removal of detrimental matter from exhaust gases to protect the environment against pollution. The cleaning device includes the container with an inlet, an outlet and a vertical partition to separate the container into two chambers which contain the water solution of chemical substances to remove the detrimental matter from the exhaust gases. The cleaning device also includes the dehydrating filters. The exhaust gases passing through the water solution and dehydrating filters are caused to give up and deposit the hydrocarbons, the particulate material and to dissolve the pollutant gases, for example, the carbon dioxide and to form the carbonic acid.

5 Claims, 1 Drawing Sheet

EXHAUST SYSTEM

BACKGROUND OF THE INVENTION

The present invention relates to exhaust systems, including exhaust systems for automobiles. Motor vehicles are the major sources of carbon monoxide and hydrocarbons. In the United States gasoline and diesel vehicles produce about 70 percent of the carbon monoxide, 50 percent of the hydrocarbons, and 35 percent of the nitrogen oxides (Laurent Hodges, "Environmental Pollution"). Acid rain and unique Los Angeles-type smog are proof of importance this problem.

Many exhaust gas cleaners are known, but none of them are completely satisfactory. Most of the existing cleaners comprise spray cleaning device to remove pollutants.

Pickering, U.S. Pat. No. 4,821,513, shows an automobile exhaust gas cleaner having a plurality of gas permeable baffle plates being sprayed with a cleaning liquid from a series of nozzles to clean the exhaust gas.

Nishinomiya, U.S. Pat. No. 3,738,085 shows a device for the removal of detrimental matter from exhaust gases. This device has a tank with mixing liquid consisting of water, phosphoric acid, peroxide of barium and peroxide of hydrogen which is dropped into the drum. Further mixing liquid is dispersed and evaporated for cleaning.

Such cleaning devices are not satisfactory. Each device relies upon expansion of the exhaust gases within the device to cool the gases and cause the vapor to condense. The contact of the exhaust gases with mixing liquid in case of spray means or dropping liquid is limited.

There are also catalytic devices to convert carbon monoxide into carbon dioxide. These devices are expensive and have low efficiency.

SUMMARY OF THE INVENTION

A cleaning device comprises a container having an inlet, an outlet and dehydrating filters. The inlet of the container is connected with a manifold of the exhaust system and with a source of compressed air. The outlet of the container is connected with a muffler and with the source of compressed air. Exhaust gases are conducted through the mixing liquid of the cleaning device and are forced to detour through openings in the partition of the container before leaving the cleaning device. This invention utilizes the interaction between the air, water, carbon monoxide, and carbon dioxide. Such reactions take place in nature forming acid rains without any catalyst. The present invention provides a liquid for more efficiency having chemical substances.

The novel features of the present invention are set in particular in the appended claims. The invention itself, however, both as to its construction and its manner of operation will be best understood from the following description of a preferred embodiment which is accompanied by the following drawings illustrating the invention.

DESCRIPTION OF AN EXHAUST SYSTEM

Figure 1:
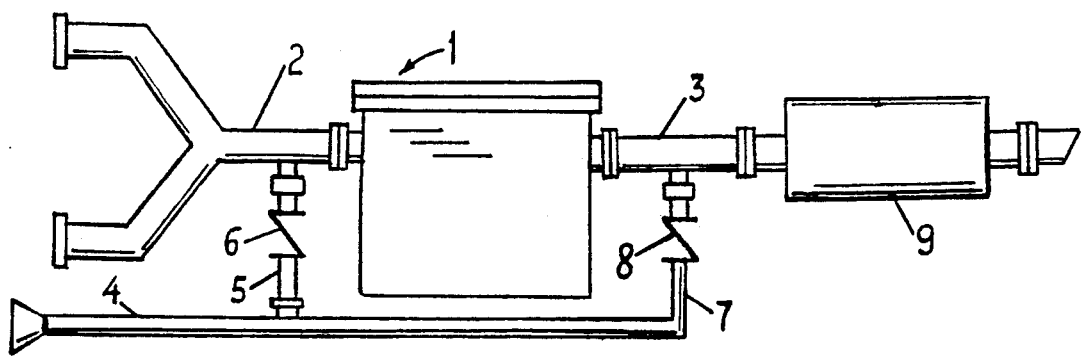
FIG. 1 is a scheme of an exhaust system for the automobile.
Figure 2:
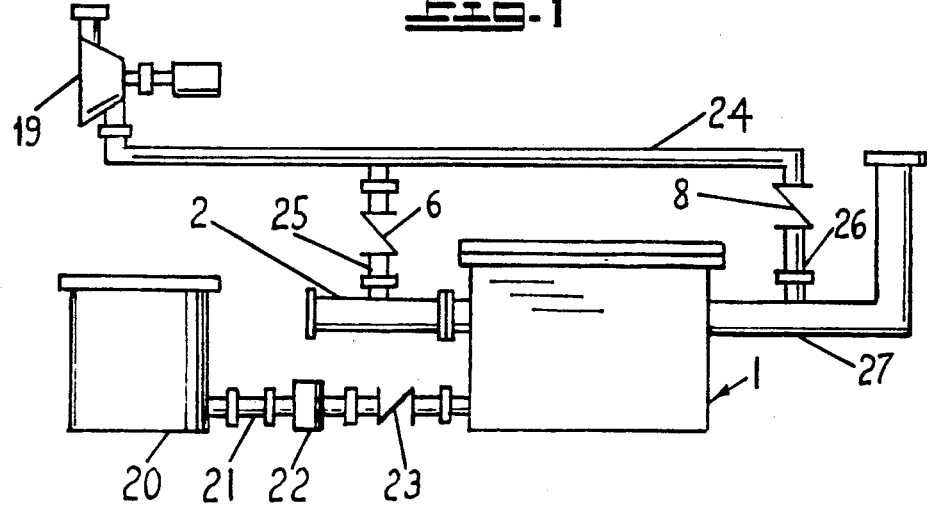
FIG. 2 is a scheme of an exhaust system for the industrial plant.
Figure 3:
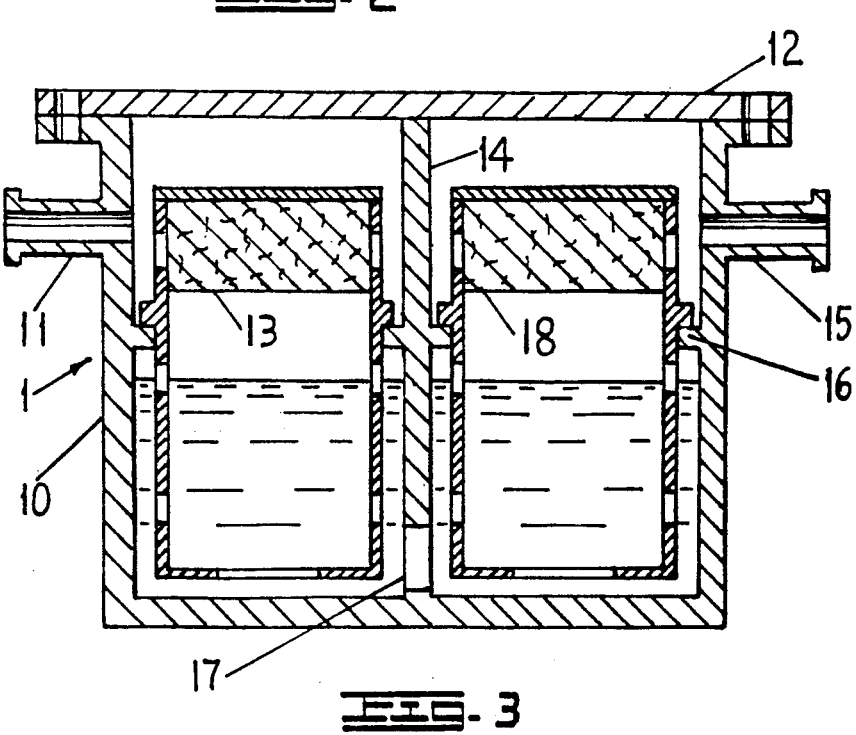
FIG. 3 is a cross section of the cleaning device for protection of the environment against pollution.

The exhaust system has a cleaning device for protection of the environment against pollution which is identified as a whole with reference numeral 1. An inlet 11 of the device 1 is joined with the exhaust pipe 2 from combustion chamber. An outlet 15 of the device 1 is joined with the muffler assembly 9 by the pipe 3. The pipe 4 is employed for introducing the airstream into the cleaning device 1 by the pipe 5 and into the exhaust pipe 3 by the pipe 7 (FIG. 1).

The pipe 24 is employed for introducing the compressed air from the compressor 19 into the cleaning device 1 by the pipe 25 and into the exhaust pipe 27 by the pipe 26. Check valves 6,8 are adapted for protection from the back flow of the exhaust gases. The exhaust system for the industrial plant comprises an additional cistern 20 having the water or the water solution of chemical substanses which enters into the device 1 through the pipe 21, pump 22 and cut-off valve 23. The valve 23 must be closed after filling hydraulic chambers of the device 1.

The cleaning device 1 includes the container 10 having the cover 12 and partition 14. There are openings 17 in the lower portion of the partition 14. The partition 14 forms two chambers inside of the container 10 for the water solution of chemical substances. As chemical substances in the water solution of the device 1 may be utilized known and conventional in the prior art phosphoric acid, peroxide of barium and peroxide of hydrogen (U.S. Pat. No. 3,738,085). It is possible to utilize others chemical substances or to utilize the water without chemical substances depending on detrimental matter of the exhaust gases.

The dehydrating filters 13 and 18 are made of porous absorbing material or contain the chemical substances to absorb the water. Filters 13 and 18 are supported by means of the stops 16. It is necessary to maintain the definite level of the water solution of chemical substances in the container 10.

Introducing the air into the cleaning device 1 has the purpose to supply an oxygen to react with the carbon monoxide, hydrocarbons, nitrogen oxide and to increase the speed of reactions. Introducing the air into the exhaust pipe has the purpose to increase the speed of gases passing through the cleaning device 1.

In the cleaning device 1 these reactions take place:

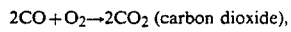

$2CO + O_2 \rightarrow 2CO_2$ (carbon dioxide),

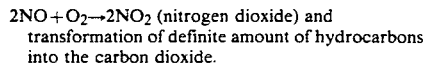

$2NO + O_2 \rightarrow 2NO_2$ (nitrogen dioxide) and
transformation of definite amount of hydrocarbons
into the carbon dioxide.

The container 10 is designed so that exhaust gases entering into the inlet 11 are forced to pass the filter 13, to pass the water solution of the chemical substances in a first chamber, to detour the vertical partition 14 passing through openings 17, to pass the water solution of the chemical substances in a second chamber, to pass the filter 18 before exiting the container 10. By passing through the water solution of the chemical substances and by reducing the temperature of the exhaust gases the pollutant-containing gases are caused to give up and deposit hydrocarbons, nitrogen oxides and particulate material, for example, carbon, dust, lead, etc., entrained in the exhaust more readily. Carbonic acid in the container 10 forms from carbon dioxide that dissolves in the liquid:

$$CO_2 + H_2O \rightarrow H_2CO_3 \text{ (carbonic acid)}.$$

The present invention provides reducing the environmental pollution and provides reducing the quantity of the carbon dioxide in the exhaust gases to prevent the global warming.

I claim:

1. An exhaust system comprising an exhaust pipe from combustion chambers, dehydrating filters, a muffler, and a cleaning device for protection of the environment against pollution having a container with an inlet and an outlet of exhaust gases, said container comprising a vertical partition to separate said container into two chamber which contain a water solution of chemical substances to remove detrimental matter from exhaust gases;

said cleaning device is arranged so that said exhaust gases are forced to pass through the water solution of the chemical substances in a first chamber, to detour the vertical partition in said water solution of the chemical substances and to pass into a second chamber before exiting said container.

2. An exhaust system as defined in claim 1, said cleaning device comprising at least two dehydrating filters; said dehydrating filters are separated by means of the vertical partition and located over the level of the water solution of the chemical substances.

3. An exhaust system as defined in claim 1, wherein said cleaning device is designed so that said exhaust gases are forced to pass through said dehydrating filter in said first chamber of said container, to detour said vertical partition in the water solution of chemical substances and to pass through said dehydrating filter in said second chamber of said container; said exhaust gases passing through said water solution of chemical substances are caused to give up and deposit the hydrocarbons, the particulate material entrained in said exhaust gases, to dissolve carbon dioxide and to form carbonic acid.

4. An exhaust system as defined in claim 1, wherein said inlet of the container is connected with the exhaust pipe having an inlet for introducing compressed air into said exhaust pipe to transform carbon monoxide of said exhaust gases into carbon dioxide.

5. An exhaust system as defined in claim 1, wherein said outlet of the container is connected with said muffler by means fo the pipe having an inlet for introducing compressed air into said pipe to increase the speed of the exiting exhaust gases.

* * * * *